United States Patent
Al-Otaibi et al.

(10) Patent No.: US 12,436,089 B2
(45) Date of Patent: Oct. 7, 2025

(54) MICROBIOLOGICALLY INDUCED CORROSION (MIC) ANALYZER

(71) Applicant: SAUDI ARABIAN OIL COMPANY, Dhahran (SA)

(72) Inventors: Mohammed H. Al-Otaibi, Riyadh (SA); Meshari S. Al-Otaibi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 621 days.

(21) Appl. No.: 17/652,880

(22) Filed: Feb. 28, 2022

(65) Prior Publication Data

US 2023/0273112 A1 Aug. 31, 2023

(51) Int. Cl.
*G01N 17/02* (2006.01)
*G01N 33/00* (2006.01)

(52) U.S. Cl.
CPC ......... *G01N 17/02* (2013.01); *G01N 33/0036* (2013.01)

(58) Field of Classification Search
None
See application file for complete search history.

(56) References Cited

U.S. PATENT DOCUMENTS

| | | | | |
|---|---|---|---|---|
| 6,329,139 B1 * | 12/2001 | Nova | ...................... | B82Y 10/00 |
| | | | | 506/40 |
| 6,540,886 B1 * | 4/2003 | Russell | ................... | C23F 13/02 |
| | | | | 204/196.07 |
| 7,264,707 B1 | 9/2007 | Furman et al. | | |
| 9,769,898 B1 * | 9/2017 | Buthker | .................. | H05B 45/10 |
| 2005/0006250 A1 * | 1/2005 | Russell | ................... | C23F 13/04 |
| | | | | 205/726 |
| 2014/0048424 A1 * | 2/2014 | Gu | ......................... | G01N 17/02 |
| | | | | 204/404 |

(Continued)

FOREIGN PATENT DOCUMENTS

| | | | | | |
|---|---|---|---|---|---|
| CN | | 107860795 A | * | 3/2018 | ............ G01D 21/02 |
| WO | WO-2018044590 A1 | * | 3/2018 | ............ G01N 33/18 |

OTHER PUBLICATIONS

CN-107860795-A translation (Year: 2018).*

(Continued)

*Primary Examiner* — Shelby A Turner
*Assistant Examiner* — Brandon J Becker
(74) *Attorney, Agent, or Firm* — Osha Bergman Watanabe & Burton LLP

(57) ABSTRACT

Described is a system for detection of microbiologically induced corrosion. The system includes a cathodic protection device configured to generate a signal corresponding to the presence of corrosion near a structure at risk of corrosion. The system also includes an odor sensor configured to generate a signal corresponding to emission of an odor near the structure. Additionally, the system includes a digital circuit connected with the cathodic protection device and the odor sensor. The digital circuit is configured to process the signals from the cathodic protection device and the odor sensor and, based on the processed signals, generate a notification corresponding to presence of microbiologically induced corrosion proximate the structure.

12 Claims, 4 Drawing Sheets

(56) References Cited

U.S. PATENT DOCUMENTS

2015/0013412 A1* 1/2015 Haverty .................. B24C 5/005
72/53

OTHER PUBLICATIONS

Khan, M.A.A et al., "Microbiologically influenced corrosion in oil and gas industries: A review"; International Journal of Corrosion and Scale Inhibition; vol. 10, Issue 1; pp. 80-106; 2021 (27 pages).

* cited by examiner

MICROBIOLOGICALLY INDUCED CORROSION (MIC) ANALYZER

BACKGROUND

Microbiologically Induced Corrosion (MIC) is corrosion that is caused by the presence and activities of microorganisms on the surface of corroding materials. MIC is of significant importance in the oil and gas industry due to major failures that can occur due to affected components. MIC affects a variety of materials, both metal and non-metal. Non-limiting examples of materials which can be impacted by MIC include stainless steel, aluminum alloys, carbon and low alloy steels, nickel alloys, copper alloys, concrete, and glass. Most MIC failures occur in stainless steel pipeline systems but can also cause reservoir souring, leakage in storage tanks, and other equipment failures.

Accordingly, there exists a need for proactively detecting and identifying MIC during construction phases of projects prior to piping and equipment use.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for detection of microbiologically induced corrosion. The system includes a cathodic protection device configured to generate a signal corresponding to the presence of corrosion proximate a structure, an odor sensor configured to generate a signal corresponding to emission of an odor proximate the structure, and a digital circuit connected with the cathodic protection device and the odor sensor. The digital circuit is configured to process the signals from the cathodic protection device and the odor sensor and based on the processed signals, generate a notification corresponding to presence of microbiologically induced corrosion proximate the structure.

In another aspect, embodiments disclosed herein relate to a method for detecting microbiologically induced corrosion. The method includes positioning at least one cathodic protection device proximate a structure, wherein the at least one cathodic protection device is configured to generate a signal corresponding to the presence of corrosion; positioning at least one odor sensor proximate the structure, wherein the at least one odor sensor is configured to generate a signal corresponding to emission of an odor; connecting at least one digital circuit with the at least one cathodic protection device and the at least one odor sensor; processing, by each digital circuit, the signals received from at least one cathodic protection device and at least one odor sensor; and based on the processed signals, generating a notification corresponding to presence of microbiologically induced corrosion proximate the structure.

Other aspects and advantages of the claimed subject matter will be apparent from the following description and the appended claims.

DETAILED DESCRIPTION (2) Specific Details of Various Embodiments

Embodiments disclosed herein relate to a device for detecting Microbiologically Induced Corrosion (MIC), which is the corrosion of a material in the presence of microorganisms. MIC typically causes metal degradation in the form of pitting, crevice, underdeposit, galvanic corrosion, and dealloying. It may be difficult to determine whether there is a relationship between detected corrosion and the presence of microorganisms. The invention described herein bridges the detection of corrosion with the detection of microorganisms by integrating cathodic protection with intrusive odor detection for proactive MIC identification, as described in detail below.

(2.1) Cathodic Protection (CP)

The first component in the MIC analyzer described herein is a CP system (or CP device). CP systems are generally used to prevent corrosion of buried natural gas pipelines. There are two types of cathodic protection: galvanic cathodic protection and impressed current cathodic protection (ICCP). Both types utilize an electrochemical reaction, where the pipeline, or other structure/material to protect from corrosion, is the cathode of the electrochemical; the cathodic protection system (ICCP or galvanic) comprises the anode. The anode and cathode are connected via a continuous electrical path while both are immersed in an electrolyte. During electrochemical corrosion, the anode in the cathodic protection system experiences corrosion, while the cathode (i.e., the protected material) is not affected unless (or until) the anode degrades.

Figure 1:
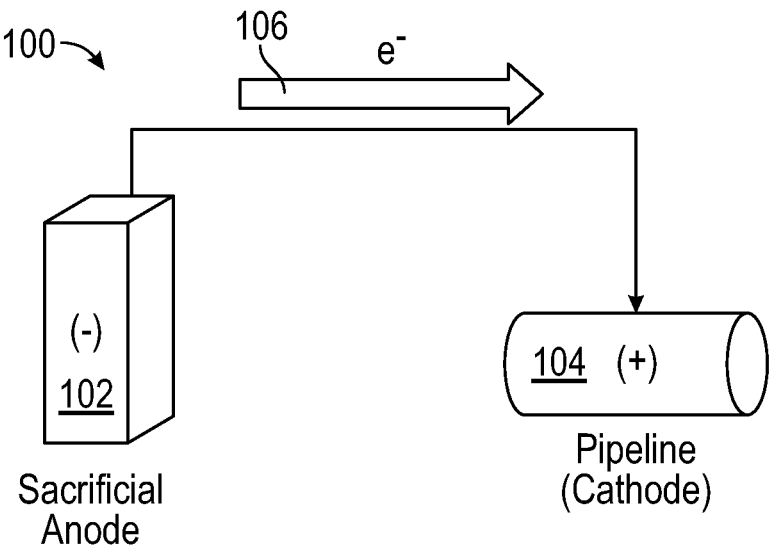
FIGS. 1-2 illustrate cathodic protection devices according to some embodiments of the present disclosure.

FIG. 1 illustrates a galvanic cathodic protection system (100). A galvanic cathodic protection system (100) does not require a power supply and uses a galvanic anode, referred to as a sacrificial anode (102), which corrodes before the base material being protected by the sacrificial anode (102), such as a stainless-steel pipeline (104). The sacrificial anode (102) is comprised of a metal having a stronger electrochemical potential than the material of the structure needing corrosion protection. The sacrificial anode (102) connected, directly or indirectly, to the protected structure (e.g., equipment, pipeline (104)) has a natural potential that is more negative than the protected structure due to the dissimilarity in the materials. Thus, when connected in a circuit, cathodic protection current flows from the anode (more negative) to the structure (less negative), thereby generating adequate electricity to form an electrochemical cell. Electrons released (106) in an anodic reaction are consumed in the cathodic reaction. Galvanic cathodic protection systems function as long as the lifespan of the sacrificial anode. The sacrificial anode (102) continues to degrade and protect the material of the protected structure until it has degraded to the point of no longer being capable of protecting the material from corrosion.

Figure 2:
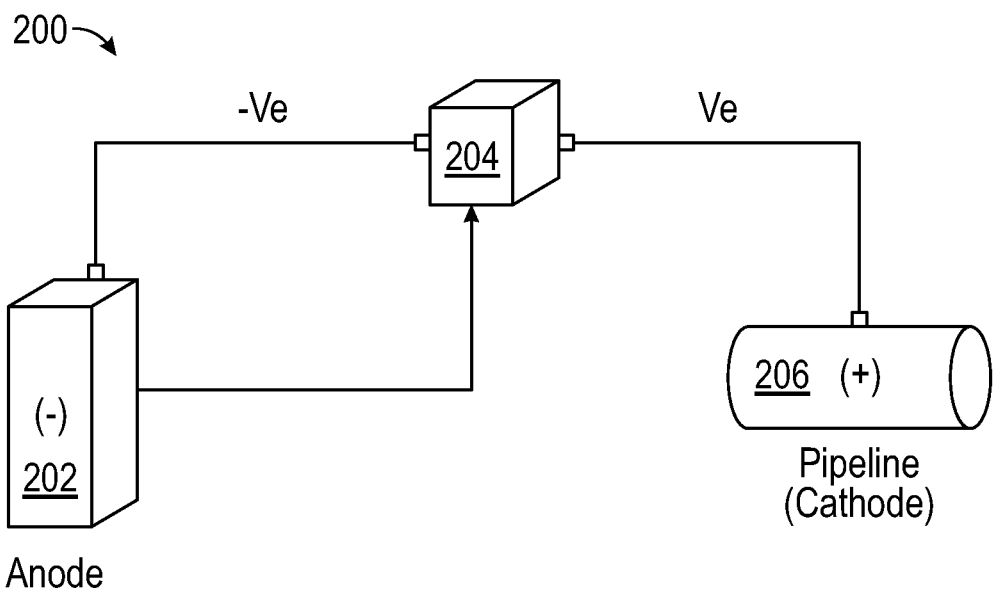

FIG. 2 illustrates an ICCP system (200). An ICCP system provides electrodes (i.e., anodes (202)) of a significantly longer lifespan than a sacrificial anode, and without needing replacement. Generally, the anode (202) includes at least one of graphite, titanium, platinum, or another inert material. Furthermore, the ICCP system (200) consists of a power source (204), such as in the form of a rectifier, that converts an alternating current (AC) power source to a direct current (DC) that is calibrated to provide the appropriate protection. The external power source (204) assists in driving the electrochemical reactions between the anode (202) and the cathode, which in this case is the pipeline (206) in FIG. 2. Due to the presence of the power source (204), larger potential differences can be generated compared to a galvanic cathodic protection system, allowing more current to flow to the protected structure.

Regardless of whether an ICCP system, a galvanic cathodic protection system, or both, are implemented in the device according to embodiments of this disclosure, monitoring of various parameters, or variables, is required to periodically assess, or measure, performance of the systems. As would be well understood by one skilled in the art, monitoring cathodic protection requires several components, such as sensors and alarms, to detect changes in the chemical composition of materials (e.g., steel pipes) and generate alerts. Non-limiting examples of equipment that may be utilized in assessing the cathodic protection system described herein include analog voltage input channels, sensor/transducer input channels, electrical resistance probes, and linear resistance probes. Non-limiting examples of parameters to be measured include rectifier voltage, rectifier current, structure-to-soil potentials, temperature, pipe pressure, and corrosion rates.

(2.2) Odor Sensor

The second component in the MIC analyzer described herein is an odor sensor. The purpose of the odor sensor is to detect the presence of odors produced by microorganisms in proximity of a structure (e.g., pipeline, equipment) that needs to be protected from corrosion. The odor sensor according to embodiments of this disclosure must be able to detect the odor released by localized acidic environments. As microbial metabolism occurs, acid is produced and a malodorous smell is produced which can be detected in a confined space due to lack of air circulation. There are a variety of sensors that can be used to detect odors caused by the presence of bacteria/microorganisms, such as artificial olfaction systems (i.e., electric noses), metal oxide sensors, and chemosensors. As a wide range of odor sensors exist, the selection of an odor sensor for implementation depends on the expected type of corrosion and the gas released after analyzing the situation.

An electronic nose is an electronic sensing device which is configured to distinguish between different odors. Non-limiting examples of sensors that are commonly used in electric noses include metal-oxide-semiconductor (MOSFET) devices, conducting polymers, polymer composites, quartz crystal microbalance (QCM), surface acoustic wave (SAW), and mass spectrometers. Generally, a chemosensor detects a signal, or activity, of a chemical species in a given medium, such as a solution, air, or water. The detection may be in the form of a single measurement or through continuous monitoring. The chemosensor provides a measurable signal in direct response to the analyte recognition such that the signal response is directly related to the magnitude of the sensing event (e.g., concentration of analyte). Chemosensors can use either a colorimetric or luminescent mechanism as an indicator of signal detection.

A metal oxide sensor adsorbs gas molecules which reduces the potential barrier by injecting electrons to a conduction band. Metal oxide sensors (MOS) are configured to detect the concentration of various types of gases by measuring the resistance change of the metal oxide due to adsorption of gases. Any of the odor sensors described above, or any other type of sensor that can detect odor, may be used as a component in the invention described herein. As can be appreciated by one skilled in the art, a geographical area may be equipped with one odor sensor or several odor sensor of different types to detect distinct types of gasses depending on the particular application and/or structure as well as the area needing MIC monitoring.

(2.3) Microbiologically Induced Corrosion (MIC) Analyzer

Figures 3, 4:
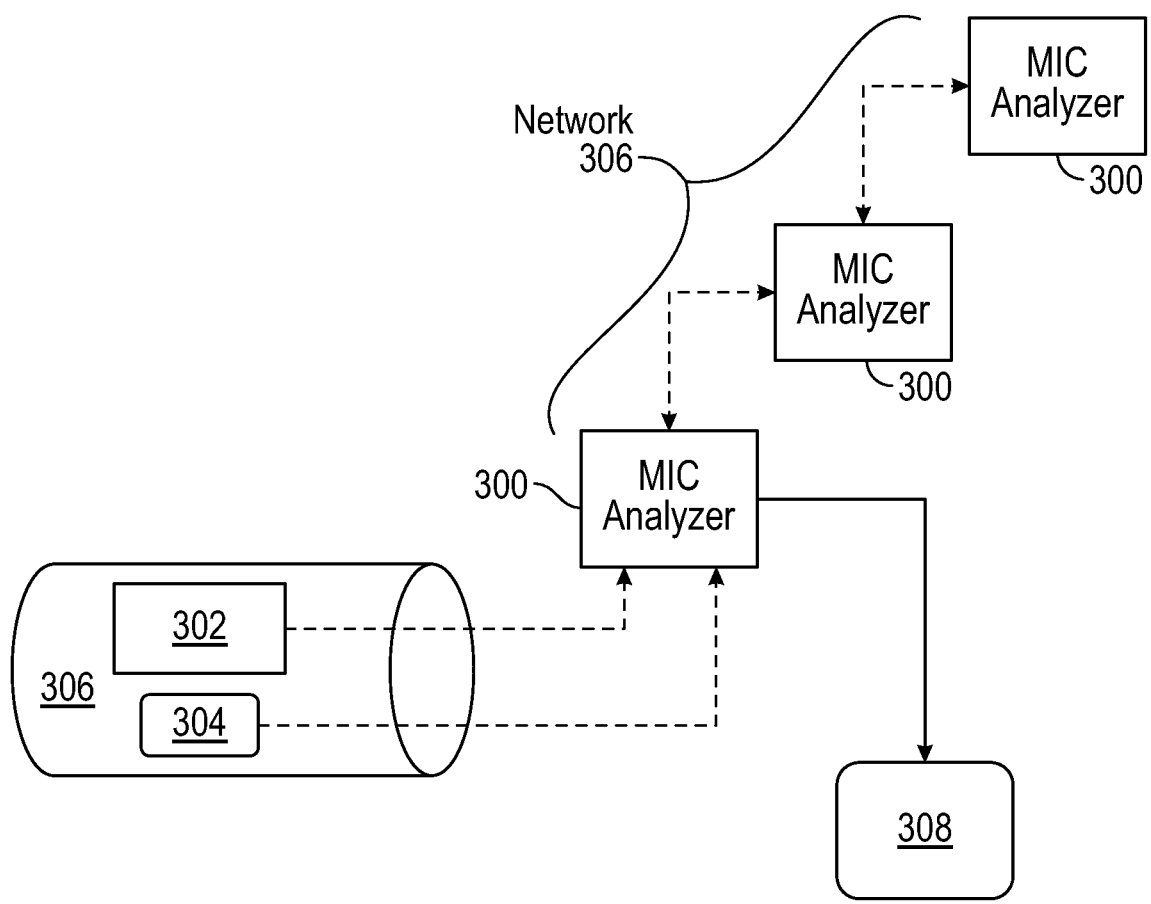
FIG. 3 illustrates a system for detection of microbiologically induced corrosion according to some embodiments of the present disclosure.
FIG. 4 illustrates a decision matrix according to some embodiments of the present disclosure.

As depicted in FIG. 3, a digital circuit (or integrated circuit), also referred to as a MIC analyzer (300), integrates the data obtained from two systems, the cathodic protection (CP) system (302) (i.e., at least one of a galvanic cathodic protection system (100) in FIG. 1 and an ICCP system (200) in FIG. 2) and one or more odor sensors (304). The MIC analyzer (300) provides a digital solution with built-in data analysis to proactively predict and prevent MIC. Generally, an integrated circuit, also referred to a chip or microchip, is a set of electronic circuits on a flat piece (or chip) of semiconductor material, such as silicon. An integrated circuit, or digital circuit, may be characterized as analog, digital, or a combination of analog and digital. One type of integrated circuit is a field-programmable gate array (FPGA). In one or more embodiments, the integrated circuit, or MIC analyzer (300) is a diode-transistor logic (DTL), where the logic gating function (e.g., AND) is performed by a diode network and the amplifying function is performed by a transistor.

Multiple MIC analyzers (300) may be wirelessly connected via a network (306), such as a mesh network. A mesh network is a local network in which the infrastructure nodes (e.g., bridges, switches, infrastructure devices) connect directly to as many other nodes as possible and cooperate with one another, allowing every node to participate in the relay of information. In the present invention, the MIC analyzers (300) are configured to connect and cooperate with one another via a wireless network (306), similar to Wi-Fi devices (i.e., short-range wireless devices). In a scenario in which the CP system (302) and odor sensor (304) detecting corrosion in a pipeline (or other structure) are in a remote geographical area, a series of MIC analyzers (300) may be wirelessly linked to one another via the network (306). The MIC analyzers (300) may receive and send signals to one another until received by an end-user's device (e.g., modem) that is geographically distant from the pipeline of interest. As can be appreciated by one skilled in the art, multiple MIC analyzers (300) may also be connected via conventional star/tree local network topologies in which the bridges/switches are directly linked to only a small subset of other bridges/switches.

Referring again to FIG. 3, the CP system (302) and the odor sensor (304) are positioned within or proximate to metallic equipment and/or structures, such as a pipeline (306). The one or more MIC analyzers (300) analyze the electronic signal data obtained from the CP system (302) and the odor sensor (304). The MIC analyzer (300) processes a CP signal and an odor sensor signal from the CP system (302) and the odor sensor (304), respectively. In suspected areas of MIC existence, analysts may determined whether one or more CP system (302)/odor sensor (304) combinations are needed depending on specific logistics, such as number of structures (e.g., pipelines) of interest as well as their geographical location. The necessary equipment (e.g., CP system, odor sensor, MIC analyzer) is then positioned accordingly.

A digital electronic circuit includes one or more inputs, and a single output is referred to as a logic gate. In one or more embodiments, the inputs to the MIC analyzer (300) may be a digital signal representing the presence of an odor (via the odor sensor) and an electronic signal representing the presence of corrosion (via the CP system). These signals are received via wired or wireless transmission of signal data from the CP system (302) and the odor sensor (304). In one or more embodiments, the digital signal data is in the form of a binary signal. The binary signals are represented by one voltage band near a reference value (e.g., zero volts), and another voltage band near the supply voltage. The binary signals consist of only two possible values represented by binary digits, or bits, which are 1 and 0 (or "false" and "true" in the Boolean domain).

The MIC analyzer (300) (or integrated circuit) described herein analyzes the signal data obtained from the CP system (302) and odor sensor (304). Based on that analysis, the existence of MIC in or near the structure (e.g., pipeline (306)) may be predicted. Significantly, the existence of MIC can be detected during a construction phase of projects where numerous piping and closed equipment's are hydrotested or are set to be hydrotested. Furthermore, the MIC analyzer (300) may include an independent power source, such as a solar power source or a battery power source. When corrosion of the protected material (e.g., pipeline (306)) is detected, an alert can be generated to inform an end-user. In one or more embodiments, the alert is a visual alert (e.g., text, graphic) electronically transmitted to a digital display (308) of one or more of a computer monitor, a tablet, a smartphone, or any other suitable device having a digital display.

In one or more embodiments, logic gates are used in detection of the existence of MIC based on a pre-logic set according to a decision matrix, such as the decision matrix shown in 400 in FIG. 4. A decision matrix (400) comprises rows and columns of values that allow for identification of relationships between the values. Logic gates are typically implemented using diodes or transistors acting as electronic switches. Boolean functions can be implemented using logic gates referred to as basic gates. An AND gate is a digital circuit having two or more inputs, which produces an output that is the logical AND of the inputs. A NOT gate is a digital circuit having a single input and a single output. The output of a NOT gate is the logical inversion of the input. In one or more embodiments, the digital circuit is designed through selecting and connecting the following logic gates: AND, NOT and NAND (not AND).

Referring to the decision matrix 400 illustrated in FIG. 4, if a cathodic protection alert is generated, but not an odor sensor alert, this is an indication of metal reduction but not MIC. In this situation, an investigation may be conducted to identify the cause of the corrosion and determined a method to prevent the corrosion. Additionally, an ultrasonic testing (UT) scan may be performed to determine the degree of corrosion. When the results of the UT scan indicate the corrosion is not severe, the structure may be maintained. When the results of the UT scan indicate severe corrosion, the structure may be replaced. If an odor sensor alert is generated, but not a cathodic protection alert, this is an indication of potential issues with dirt or ventilation in the area, or early-stage MIC. In this scenario, a cleaning of the area can be performed. If both a cathodic protection alert and an odor sensor alert are generated, then a determination of the existence of MIC is made. Similar to the actions performed if only metal reduction is detected, a UT scan may be performed to determine whether to keep or replace the impacted structure.

Figure 5:
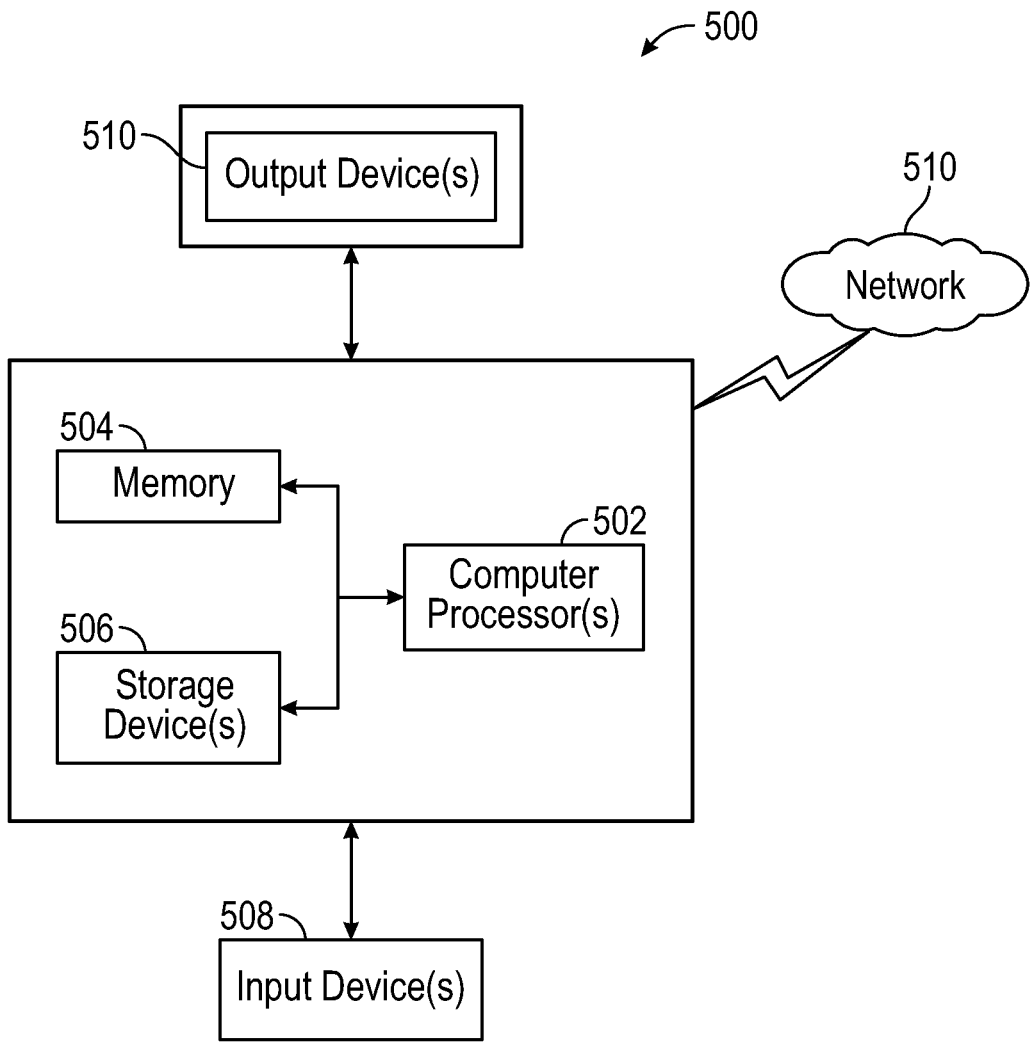
FIG. 5 illustrates a computing system according to some embodiments of the present disclosure.

One or more embodiments of the invention described herein can be implemented on a computing system. Any combination of mobile, desktop, server, router, switch, embedded device, or other types of hardware may be used. FIG. 5 illustrates an exemplary computing system (500). The computing system (500) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output devices)(s) to perform one or more embodiments disclosed herein. For example, as shown in FIG. 5 the computing system (500) may include one or more computer processor(s) (502), associated memory (504) (e.g., random access memory (RAM), cache memory, flash memory), one or more storage device(s) (506) (e.g., a hard disk, an optical drive such as a compact disk (CD) drive or digital versatile disk (DVD) drive, a flash memory stick), and numerous other elements and functionalities. The computer processor(s) (502) may be an integrated circuit for processing instructions. For example, the computer processor(s) may be one or more cores, or micro-cores of a processor. The computing system (500) can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based).

The computing system (500) may also include one or more input device(s) (508), such as a camera, imager, touchscreen, keyboard, mouse, microphone, touchpad, electronic pen, or any other type of input device. Further, the computing system (500) may include one or more output device(s) (510), such as a screen (e.g., a liquid crystal display (LCD), a plasma display, touchscreen, cathode ray tube (CRT) monitor, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) (508), (510) may take other forms.

Further, one or more elements of the computing system (500) may be located at a remote location and be connected to the other elements over a network (512). Further, one or more embodiments may be implemented on a distributed system having a plurality of nodes, where each portion of the embodiment may be located on a different node within the distributed system. In one embodiment, the node corresponds to a distinct computing device. In other embodiments, the node may correspond to a computer processor with associated physical memory. In yet other embodiments, the node may correspond to a computer processor or microcore of a computer processor with shared memory and/or resources. Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Embodiments of the present disclosure may provide at least one of the following advantages. First, the CP system and one or more odor sensors according to embodiments of this disclosure are easy to install during a construction phase of a project using materials and equipment that are susceptible to MIC. The MIC analyzer described herein provides real time data monitoring of the CP system and odor sensor, enabling a notification, or alert, to be sent immediately to end users. By proactively detecting MIC during a construction phase, project equipment and materials may be preserved prior to a starting the project, providing a very cost-effective solution to MIC. Additionally, the MIC analyzer and corresponding CP system and odor sensor together form an environmentally friendly solution to MIC detection and prevention.

Figure 6:
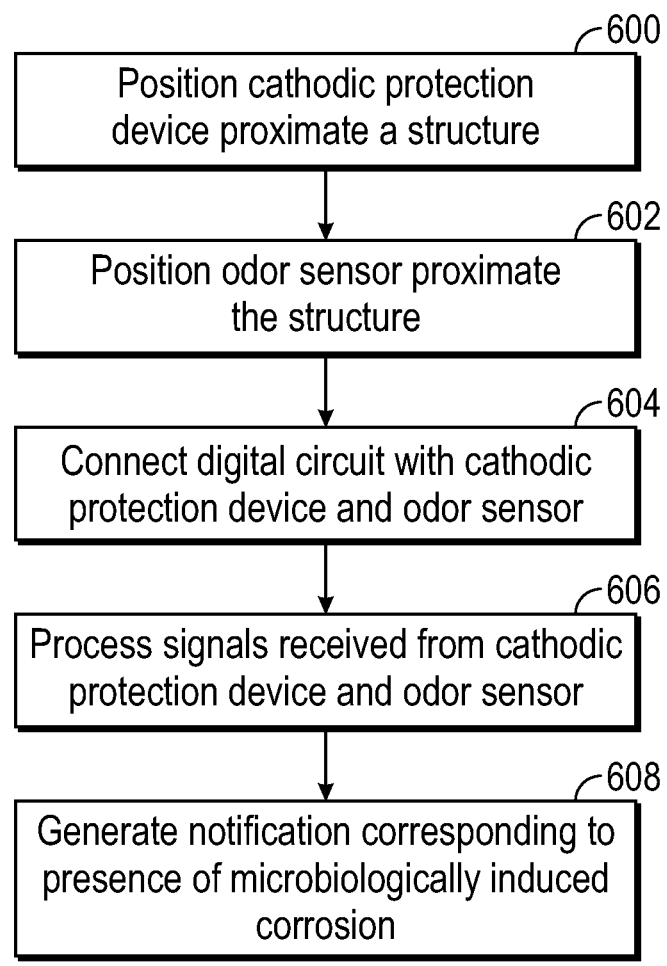
FIG. 6 is a flow diagram illustrating a method for detecting microbiologically induced corrosion according to some embodiments of the present disclosure.

FIG. 6 is a flow diagram depicting an embodiment of the process for detecting microbiologically induced corrosion described herein. In an initial step (600), at least one cathodic protection device is positioned proximate a structure. In a subsequent step (602), at least one odor sensor is positioned proximate the structure. In a subsequent step (604), at least one digital circuit is connected with the at least one cathodic protection device and the at least one odor sensor. In another step (606), each digital circuit processes the signals received from at least one cathodic protection device and at least one odor sensor. In a subsequent step (608), based on the processed signals, a notification corresponding to presence of microbiologically induced corrosion proximate the structure is generated.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A system for detection of microbiologically induced corrosion, comprising:
    at least one cathodic protection device configured to generate a signal corresponding to the presence of corrosion proximate a structure;
    at least one odor sensor configured to generate a signal corresponding to emission of an odor caused by the presence of microorganisms proximate the structure; and
    at least one diode-transistor logic digital circuit connected with the at least one cathodic protection device and the at least one odor sensor,
    wherein the at least one diode-transistor logic digital circuit is configured to perform a logic gating function based on a pre-logic set according to a decision matrix,
    wherein each diode-transistor logic digital circuit is configured to process the signals from the at least one cathodic protection device and the at least one odor sensor and, in response to a first signal indicating the presence of corrosion, generate a first notification corresponding to the presence of corrosion proximate the structure,
    in response to a second signal indicating the presence of the odor, generate a second notification corresponding to the presence of the odor proximate the structure, and
    in response to both the first signal and the second signal, generate a third notification corresponding to presence of microbiologically induced corrosion proximate the structure.

2. The system as set forth in claim 1, wherein a plurality of the diode-transistor logic digital circuits are connected via a wireless network.

3. The system as set forth in claim 1, wherein each cathodic protection device is one of a galvanic cathodic protection device and an impressed current cathodic protection device.

4. The system as set forth in claim 1, wherein each diode-transistor logic digital circuit is powered by at least one of a solar power source and a battery power source.

5. The system as set forth in claim 1, wherein each diode-transistor logic digital circuit is configured to continuously monitor the at least one cathodic protection device and the at least one odor sensor.

6. The system as set forth in claim 1, wherein the diode-transistor logic digital circuit is an integrated circuit.

7. A method for detecting microbiologically induced corrosion, comprising:
    positioning at least one cathodic protection device proximate a structure, wherein the at least one cathodic protection device is configured to generate a signal corresponding to the presence of corrosion;
    positioning at least one odor sensor proximate the structure, wherein the at least one odor sensor is configured to generate a signal corresponding to emission of an odor caused by the presence of microorganisms;
    connecting at least one diode-transistor logic digital circuit with the at least one cathodic protection device and the at least one odor sensor;
    processing, by each diode-transistor logic digital circuit, the signals received from the at least one cathodic protection device and the at least one odor sensor,
    wherein the processing by the at least one diode-transistor logic digital circuit comprises performing a logic gating function based on a pre-logic set according to a decision matrix;
    in response to a first signal indicating the presence of corrosion, generating a first notification corresponding to the presence of corrosion proximate the structure;
    in response to a second signal indicating the presence of the odor, generating a second notification corresponding to the presence of the odor proximate the structure; and in response to both the first signal and the second signal, generating a third notification corresponding to presence of microbiologically induced corrosion proximate the structure.

8. The method as set forth in claim 7, further comprising connecting a plurality of the diode-transistor logic digital circuits via a wireless network.

9. The method as set forth in claim 7, further comprising continuously monitoring, by each diode-transistor logic digital circuit, the at least one cathodic protection device and the at least one odor sensor.

10. The method as set forth in claim 7, wherein in response to the first notification corresponding to the presence of corrosion, identifying a cause of corrosion via ultrasonic testing.

11. The method as set forth in claim 7, wherein in response to the second notification corresponding to the presence of odor, performing a cleaning process proximate the structure.

12. The method as set forth in claim 7, wherein in response to the third notification corresponding to the presence of microbiologically induced corrosion, determining whether to replace the structure.

* * * * *